United States Patent [19]

Blackman

[11] Patent Number: 4,881,909
[45] Date of Patent: Nov. 21, 1989

[54] HOSE ASSEMBLY FOR CANISTER VACUUM CLEANER

[75] Inventor: Gordon R. Blackman, Lexington, Ky.

[73] Assignee: Whirlpool Corporation, Benton Harbor, Mich.

[21] Appl. No.: 264,550

[22] Filed: Oct. 31, 1988

[51] Int. Cl.$^4$ .............................................. H01R 4/60
[52] U.S. Cl. ..................................... 439/191; 15/377; 174/47
[58] Field of Search .............. 439/191, 192, 194, 195, 439/449; 174/47; 15/377; 285/7

[56] References Cited

U.S. PATENT DOCUMENTS

| | | | |
|---|---|---|---|
| 3,034,085 | 5/1962 | Pauler et al. | 339/16 |
| 3,928,715 | 12/1975 | Holden | 174/47 |
| 4,012,091 | 3/1977 | Westergren | 439/192 |
| 4,018,493 | 4/1977 | Lyman et al. | 439/195 |
| 4,094,535 | 6/1978 | Minton | 439/194 X |
| 4,162,370 | 7/1979 | Dunn et al. | 174/47 |

Primary Examiner—Eugene F. Desmond
Attorney, Agent, or Firm—Wood, Dalton, Phillips, Mason & Rowe

[57] ABSTRACT

An electrically conductive hose assembly for a vacuum cleaner includes a hose body having a plurality of resilient helical conductive wires and a handle assembly having a projecting hollow end portion received within the hose body. Handle assembly wires are connected to the hose body wires by terminals fitted over the wire ends and crimped thereto, and a shrink wrap insulation is secured therearound. The hollow end portion has outwardly projecting wire termination blocks defining circumferential slots for removably securing the hose body wire end portions adjacent their connection to the handle wires, and the hollow end portion includes a depressed section aligned with that connection. At least one of the hose wires is secured between the hollow end portion and an axially extending resilient arm which is supported from one end in a radially spaced relation from the hollow end portion and has an inwardly extending tab at the other end. A removable sleeve is also disposed around the hose body and has inwardly projecting tabs. Mounting tabs project outwardly from opposite sides of the handle assembly end portion, and engage the sleeve tabs when the sleeve is mounted thereon.

28 Claims, 1 Drawing Sheet

U.S. Patent   Nov. 21, 1989   4,881,909
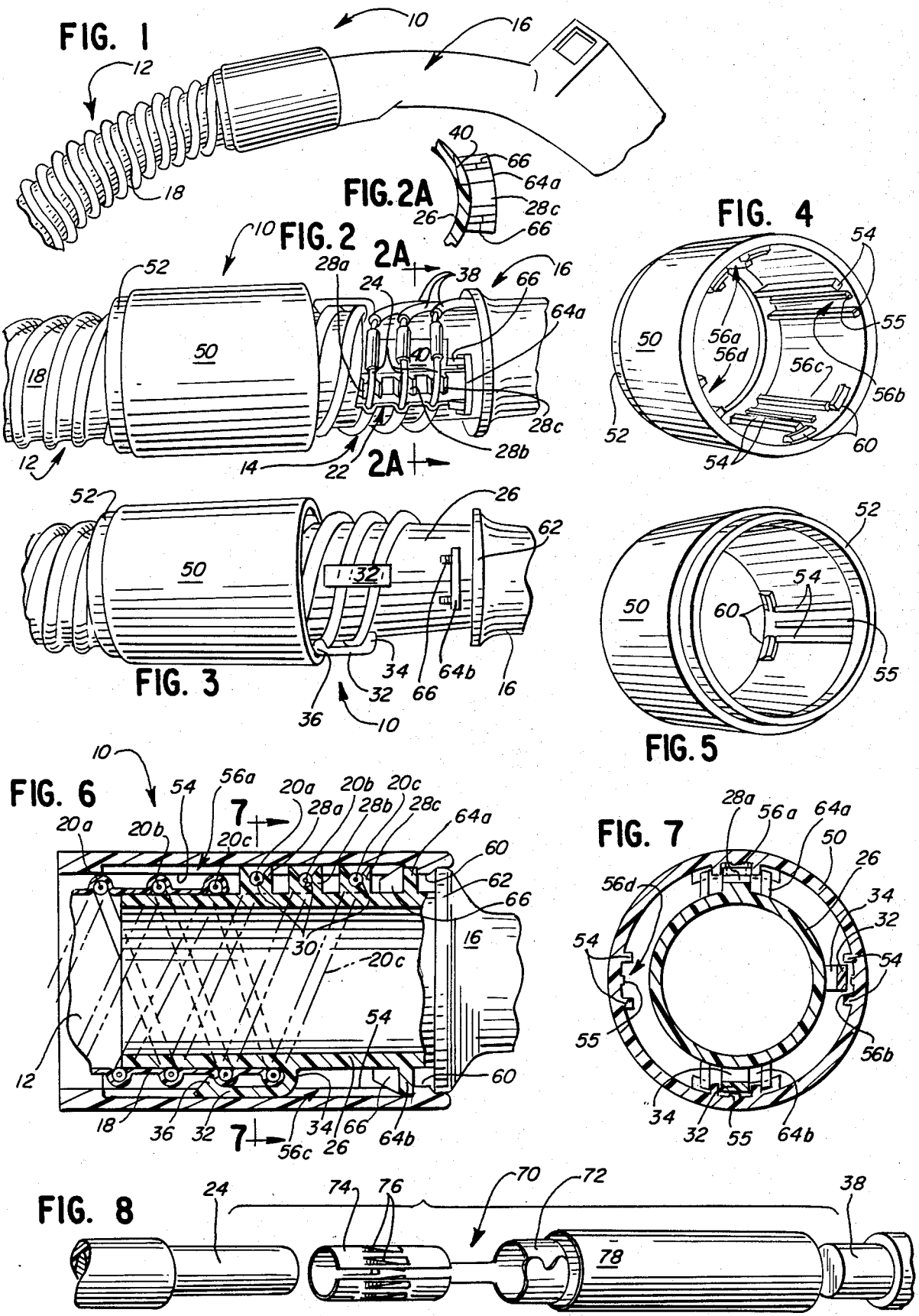

4,881,909

HOSE ASSEMBLY FOR CANISTER VACUUM CLEANER

TECHNICAL FIELD

The present invention relates to a vacuum cleaner, and more particularly to a hose assembly used with a canister vacuum cleaner.

BACKGROUND OF THE INVENTION

Canister vacuum cleaners are well known in the art in which a canister unit having a vacuum motor plugged into house current draws a vacuum through a flexible hose and handle unit manipulated by the user to vacuum desired areas of the floor. When used on carpeted areas and the like, the handle is commonly attached to a rolling unit which has electrically driven beater bars and spiral brushes which loosen dirt from the carpet so that it may be more easily picked up by the force of the vacuum. Power is supplied to the beater by an electrical connection extending from the canister through the hose and handle.

Prior art structures such as shown in Holden U.S. Pat. No. 3,928,715 and Pauler et al. U.S. Pat. No. 3,034,085 have provided simultaneous mechanical and electrical connections between flexible vacuum hoses and a terminal in a hose cuff or handle. Also, prior art structures have provided strain relief for the electrical connection of the hose to the cuff by mechanically securing the cuff to the exterior of the hose with a separate mechanical connection of the hose wire to the cuff (see, for example, Dunn U.S. Pat. No 4,162,370 and Minton U.S. Pat. No. 4,094,535). These structures do not, however, facilitate certainty of location of the wire connection, and in addition, complicate manufacture and maintenance of the vacuum cleaner.

The present invention is directed toward overcoming one or more of the problems set forth above.

SUMMARY OF THE INVENTION

In one aspect of the present invention, an electrically conductive hose assembly for a vacuum cleaner is provided including a hose body having a plurality of resilient helically wound conductive wires and a handle assembly having a projecting hollow end portion received within the hose body. The hollow end portion has a plurality of outwardly projecting wire termination blocks for removably securing the wire end portions. A removable sleeve is disposed around the hose body receiving the handle assembly end portion, the sleeve when so disposed preventing removal of the wire end portions from the termination blocks.

In another aspect of the present invention, the handle assembly also has conductive wires which are connected to the hose body wires by terminals fitted over the wire ends and crimped thereto. A shrink wrap insulation or a suitable preformed insulating tube is secured around each terminal and the wire ends at their connection.

In still another aspect of the present invention, the exposed end portions of the hose body wires extend beyond the termination blocks for connection to the handle wires, and a depressed section in the handle hollow end portion is aligned with the connected wire ends.

In a further aspect of the present invention, the termination blocks define substantially circumferentially extending slots receiving the hose wires, and are axially spaced to accommodate the ends of the helically wound wires.

Another aspect of the present invention is the provision of an axially extending resilient arm supported from one end in a radially spaced relation from the handle assembly end portion. At least one of the hose wires is located between the arm and the end portion, and an inwardly extending tab at the other end of the arm engages the hose wire to hinder separation of the hose and handle.

Still another aspect of the present invention is the provision of mounting tabs projecting outwardly from opposite sides of the handle assembly end portion and matching inwardly projecting tabs on the sleeve. The tabs engage to secure the sleeve to the handle assembly end portion, and the tabs disengage when the sleeve is flattened to allow for removal of the sleeve during maintenance.

The present invention provides a hose assembly which has a secure connection between the hose and handle. The electrical wires extending through the hose and handle are securely connected to prevent unwanted disconnection of the wires during use. The connection between the wires is protected against undesirable mechanical strain to further protect against disconnection. The assembly also provides a protective covering which prevents pinching or shocking of the user. Further, this assembly provides for particularly easy and reliable assembly during manufacture and maintenance.

BRIEF DESCRIPTION OF THE DRAWINGS

FIG. 1 is a perspective view of the hose connected to the vacuum cleaner handle;

FIG. 2 is a perspective view showing one side of the hose and handle (with the protective sleeve retracted);

FIG. 2A is a fragmentary cross-sectional view taken along line 2A—2A of FIG. 2;

FIG. 3 is a perspective view similar to FIG. 2 but showing the opposite side of the hose and handle;

FIG. 4 is a perspective view showing the interior of the protective sleeve;

FIG. 5 is a perspective view similar to FIG. 4 but from the opposite end of the sleeve;

FIG. 6 is a cross-sectional view of the hosehandle connection;

FIG. 7 is a cross-sectional view taken along line 7—7 of FIG. 6 (but with the wires not shown); and FIG. 8 is an exploded perspective view of the connection of the hose and handle wires.

DESCRIPTION OF THE PREFERRED EMBODIMENT

The hose assembly 10 of the present invention is shown assembled in FIG. 1. The assembly 10 includes a flexible hose 12 which is securable at its proximal end to a canister (not shown) housing the vacuum motor and dust bag, and secured at its distal end 14 to a handle assembly 16. (As used herein, "proximal" refers to the end nearest the vacuum canister and "distal" refers to the end nearest the cleaning portion of the vacuum—i.e., the cleaning attachment).

The handle assembly 16 on its distal end is adapted for securing to suitable cleaning attachments (not shown). It should be understood that this invention is not, however, limited to the connection of a hose 12 to a handle assembly, as many or all aspects of this invention would be equally usable at the connections of a hose 12 at either end to many different types of terminal assemblies. For example, this invention is usable in a swivel terminal assembly in a canister vacuum cleaner or a wall socket-insertable terminal assembly in a central vacuum cleaning system.

In canister type vacuum cleaners, various attachments can be used, including brushes, furniture nozzles, and carpet cleaning units with electrically driven beater bars and spiral brushes. When the latter attachment is used, it is necessary to provide electrical current to the cleaning unit. Such a current is typically provided by wires extending through the hose 12 and connected to wires in the handle assembly 16, which handle wires are secured to a plug (not shown) for easy connection to any attachment requiring electrical current.

The hose 12 includes a flexible tubular hose body 18 partially supported by three insulated, electrically conductive hose wires 20a–c wound helically around the inside of the hose body 18 (see FIG. 6). The three hose wires 20a–c are suitably connected to current at the proximal end of the hose 12 (not shown), and are resilient so as to both provide rigidity to the hose 12 as well as to allow the flexibility required for easy manipulation by a user. Copper coated steel wire has been found to be particularly suitable for this purpose. (Further, it should be recognized that hoses having more or fewer than three wires could also be used within the scope of this invention.)

As best seen in FIG. 2, the hose body 18 is terminated at its distal end 14 with a helical end resulting in a substantially axial cut 22, and the end portions 24 of each of the hose wires 20a–c project a short distance beyond that axial cut 22.

The handle assembly 16 is made of a suitably hard material (such as plastic) so as to be substantially rigid, and includes a hollow proximal end portion 26 which is tightly received within the hose body 18 in line-to-line fashion, creating an airtight friction seal (see particularly FIGS. 2 and 6). Extending radially out from the handle assembly end portion 26 are three wire termination blocks 28a–c which define circumferentially oriented grooves or slots 30 receiving the hose wire end portions 24.

The handle assembly end portion 26 further includes a pair of resilient arms or clips 32 extending axially from supporting legs 34 at their distal ends. The arms 32 are circumferentially spaced and axially offset as well to accommodate the helical winding of the hose wires 20a–c (see FIG. 3).

Each arm 32 has an inwardly projecting tab 36 at its proximal end which tends to grasp the hose wires 20b–c (and hose body 18) to prevent undesirable pulling apart of the hose 12 and handle assembly 16. During assembly or maintenance, the resilient arms 32 will, however, flex sufficiently to allow the hose wires 20b–c to fit between the handle assembly end portion 26 and the tab 6 to assemble or separate the hose 12 and handle assembly 16, as will become apparent.

The hose wires 20a–c are connected to handle wires 38 adjacent the wire termination blocks 28a–c (see FIG. 2). The handle wires 38 can be stranded wires and, as previously mentioned, are typically secured to a suitable plug on the handle assembly 16. A particularly suitable wire connection is described in detail below with respect to FIG. 8.

The handle assembly end portion 26 also has a depressed or reduced diameter portion 40 (see FIG. 2A) adjacent to the wire termination blocks 28a–c and radially inwardly from the wire connections, which portion 40 provides additional clearance for those connections as will become apparent.

A tubular sleeve 50 made of suitable hard and insulating material (such as plastic) is disposed over the assembled connection of the hose 12 and the handle assembly end portion 26 (the method of assembly is also further described below).

The sleeve 50 includes a proximal end portion 52 having a reduced inner diameter substantially the same as the hose body 18 outer diameter at the windings of the wires 20a–c. The proximal end portion thus substantially encloses the hose 12 at its distal end 14.

Within the sleeve 50 are also four sets of axial flanges 54 defining axial grooves 56a–d at 90 degree spacing (see particularly FIG. 7). Centrally located within each of the axial grooves 56a–d are axial ribs 55, which are of less height than axial flanges 54 and permit additional clearance between the hose and sleeve.

The top and bottom sleeve grooves 56a, 56c each have a pair of associated inwardly projecting tabs 60 at the distal end of the sleeve 50, which tabs 60 are circumferentially spaced to clear the termination blocks 28a–c of the handle assembly end portion 26.

The handle assembly 16 includes an outwardly projecting annular rib 62 at the distal end of the handle assembly end portion 26. A pair of mounting flanges or tabs 64a–b (see FIGS. 2, 3 and 6) also project outwardly from the handle assembly end portion 26 at 180 degree spacing, one mounting tab 64a being aligned with the termination blocks 28a–c and both mounting tabs 64a–b being axially spaced from the annular rib 62 approximately the axial thickness of the sleeve tabs 60 (see particularly FIG. 6). The mounting tabs 64a–b are wider than the termination blocks 28a–c, and are reinforced against axial bending by axial ribs 66.

One of the side sleeve grooves 56b or 56d receives one of the arms 32 (as does the bottom sleeve groove 56c–see FIG. 6). The other side sleeve groove 56d or 56b serves merely to allow the sleeve 50 to be assembled with the top and bottom reversed In fact, it is desirable for the other side sleeve groove 56d or 56b to be spaced from the handle assembly end portion 26 for maintenance, as will become apparent.

The sleeve 50 thus ensures that the arms 32 are maintained parallel to the handle assembly end portion 26 with their tabs 36 mechanically holding the hose wires 20b–c thereon, and further ensure that the hose wires 20a–c are retained in the wire termination blocks 28a–c.

A preferred structure for securing the hose wire ends 24 to the handle wires 38 is shown in detail in FIG. 8. Specifically, an Ark-Les Corp. harness terminal 70 is on one end 72 crimped to the stranded handle wires 38. The opposite terminal end 74 is mated over the hose wire end 24, and has inwardly extending fingers 76 which engage the end of the copper coated steel hose wire 24. The wire end 24 may thus be simply pushed into the terminal end 74 into electrical contact with the handle wire 38, and the fingers 76 secure it against being inadvertently pulled out of the terminal 70. A suitable shrink wrap insulation or suitable preformed insulating tube 78 is also provided over the ends of the wires 24, 38 and the terminal 70.

With the above described structure, assembly and disassembly (e.g., for maintenance) may be accomplished quickly, easily, and reliably.

Specifically, the sleeve 50 is first mounted over the distal end 14 of the hose 12 (with the sleeve proximal end portion 52 being fit over the hose 12 first). The handle assembly end portion 26 is then inserted into the distal end 14 of the hose 12, until the hose wires 20b-c are located between both arms 32 and the handle assembly end portion 26, and the hose wire end portions 24 are disposed in the termination blocks 28a-c. The hose wire end portions 24 are then suitably connected to the handle wires 38 (as previously described with respect to FIG. 8). The sleeve 50 is then pulled in a distal direction over the hose 12 and handle assembly end portion 26 with grooves 56a, 56c aligned with the mounting tabs 64a-b, until the sleeve tabs 60 snap in place between the mounting tabs 64a-b and the annular rib 62 (see FIG. 6).

When so assembled, the hose 12 and handle assembly 16 are securely connected together with virtually no axial strain on the wires 20a-c, thereby eliminating any risk of the wires becoming disconnected. Further, the user is protected from all electrical wires and connections by the sleeve 50.

Still further, maintenance on the hose assembly (e.g., replacing a punctured hose) may be easily accomplished by simply squeezing the sleeve 50 at the sides (particularly at the groove 56d or 56b which does not engage an arm 32), as the resulting slight flattening of the circular sleeve 50 will widen the sleeve 50 at the top and bottom. This widening of the sleeve 50 thus causes the sleeve tabs 60 to separate, allowing them to pass clear of the mounting tabs 64a-b as the sleeve 50 is moved over the hose 12. Of course, by providing a sleeve 50 with suitable rigidity (e.g., where flattening cannot be accomplished solely by hand), such disassembly can be easily accomplished when desired while at the same time preventing inadvertent disassembly during use.

The hose assembly 10 as described above thus has a secure connection between the hose 12 and handle assembly 16, with the electrical wires 20a-c, 38 extending through the hose 12 and handle assembly 16 being securely connected and mounted to prevent unwanted disconnection of the wires 20a-c, 38 during use. The hose assembly 10 also provides a protective sleeve 50 which not only protects the assembly 10, but also protects the user by preventing pinching or shocking of the user. Further, this hose assembly 10 provides for particularly easy and reliable assembly during both manufacture and maintenance. Still further, this hose assembly 10 assures that the wire ends 24, 38 are precisely located at the connection, thereby eliminating uncertainty regarding the necessary wire end length and thus further simplifying assembly and maintenance.

Other aspects, objects, and advantages of the present invention can be obtained from a study of the specification, drawings and appended claims.

I claim:

1. An electrically conductive hose assembly for a vacuum cleaner, comprising:
    a hose body having a plurality of resilient helical electrically conductive wires, said wires having end portions terminating along a line substantially axial with respect to said hose body;
    a terminal assembly having a projecting hollow end portion received within said hose body, said hollow end portion having on its exterior a plurality of outwardly projecting wire termination blocks for removably securing said wire end portions; and
    a removable sleeve disposed around the hose body receiving the terminal assembly end portion, said sleeve when so disposed preventing removal of the wire end portions from the termination blocks.

2. The hose assembly of claim 1, further comprising terminal conductive wires secured to said hose body wires adjacent said termination blocks.

3. The hose assembly of claim 2, further comprising wire harness terminals, each of said terminals fitting over an end of one terminal wire and one hose body wire end portion.

4. The hose assembly of claim 3, wherein said harness terminals are crimped to the terminal wire end portions and connected to the hose body wire ends, and insulation is secured around each harness terminal and the wire ends at their connection.

5. The hose assembly of claim 2, wherein the hose body wire end portions are exposed and extend beyond the termination blocks for connection to the terminal wires, and further comprising a depressed section in said terminal hollow end portion aligned with the connected end portions of the hose body wires and terminal wires.

6. The hose assembly of claim 5, further comprising wire harness terminals, each of said terminals fitting over an end of one terminal wire and one hose body wire end portion.

7. The hose assembly of claim 6, wherein said harness terminals are crimped to the terminal wire end portions and connected to the hose body wire ends, and insulation is secured around each harness terminal and the wire ends at their connection.

8. The hose assembly of claim 1, wherein the termination blocks define substantially circumferentially extending slots receiving the hose wires.

9. The hose assembly of claim 8, wherein the termination blocks are axially spaced to accommodate the ends of the helically wound wires.

10. The hose assembly of claim 9, further comprising an axially extending resilient arm supported from one end in a radially spaced relation from the terminal assembly end portion, said arm further having an inwardly extending tab at its other end whereby at least one of the hose wires is located between said arm and said terminal assembly end portion with the arm tab engaging said one hose wire to hinder separation of the hose and terminal assembly.

11. The hose assembly of claim 10, wherein said arm and said termination blocks are spaced circumferentially around the terminal assembly end portion, and are further axially offset to accommodate the helical winding of the hose wires.

12. The hose assembly of claim 1, further comprising:
    mounting means projecting outwardly from the terminal assembly end portion; and
    an inwardly projecting tab on said sleeve engaging said mounting means to secure said sleeve to said terminal assembly end portion.

13. The hose assembly of claim 12, wherein said mounting means project from opposite sides of the terminal assembly end portion, whereby flattening of the sleeve disengages said sleeve tab therefrom for removal of the sleeve during maintenance.

14. An electrically conductive hose and handle for a vacuum cleaner, comprising:
    a hose having
        a flexible tubular body securable on its proximal end to the vacuum cleaner, and
        a plurality of resilient conductive hose wires wound helically within said tubular body to provide support therefor, each of said hose wires having an end portion projecting from the distal end of the tubular body;

a handle secured to the distal end of the hose tubular body and having means for securing a cleaner attachment to the handle distal end, a tubular proximal end of the handle extending into the distal end of the hose tubular body, said proximal end having means for securing said hose wire end portions against axial movement with respect to the proximal end, said hose wire end portions further being precisely located with respect to said proximal end, and a handle plug with a plurality of connector wires, each of said handle wires having an end projecting substantially helically around said handle proximal end; and means for connecting the hose wire end portions to the handle wire ends.

15. The structure of claim 14, further comprising means for covering the connection of the hose and handle.

16. The structure of claim 15, further comprising mounting means projecting outwardly from the handle proximal end, wherein said covering means comprises:

a substantially rigid sleeve extending over said hose tubular body and said handle tubular proximal end, said sleeve having inwardly projecting tabs engaging said mounting means to secure said sleeve to said handle proximal end.

17. The structure of claim 16, wherein said mounting means project from opposite sides of the handle proximal end, whereby flattening of the sleeve disengages said sleeve tabs therefrom for removal of the sleeve during maintenance.

18. The structure of claim 14, wherein said wire connecting means comprises wire harness terminals, each of said terminals fitting over one end portion of one hose wire and on handle wire end.

19. The structure of claim 18, wherein insulation is secured around the terminal and wires at their connection.

20. The structure of claim 14, wherein the securing means for the hose wires and handle wires comprises wire termination blocks defining substantially circumferentially extending slots receiving the hose wire end portions.

21. The structure of claim 20, wherein the termination blocks are axially spaced to accommodate the helically wound hose wire end portions.

22. The structure of claim 21, wherein the securing means for hose wires and handle wires further comprises an axially extending arm supported from its distal end in a radially spaced relation from the handle proximal end, said arm further having an inwardly extending tab at its proximal end whereby at least one of said hose wires is located between said arm and said handle proximal end with the arm tab engaging said one hose wire to hinder separation of the hose and handle.

23. The structure of claim 22, wherein said arm and said termination blocks are spaced circumferentially around the handle proximal end, and are further axially offset to accommodate the helical winding of the hose wires.

24. The structure of claim 20, wherein said hose wire end portions have exposed portions extending beyond the termination blocks for connection to the handle wire ends, and further comprising a depressed section in said handle proximal end aligned with said wire connecting means.

25. The structure of claim 24, wherein said wire connecting means comprises wire harness terminals, each of said terminals fitting over one end portion of one hose wire and one handle wire end.

26. The structure of claim 25, wherein said terminals are pushed on to the hose wires and crimped to the handle wires, and a shrink wrap insulation is secured around the terminal and wires at their connection.

27. An electrically conductive hose assembly for a vacuum cleaner, comprising:

a self supporting hose body having a plurality of resilient metal helical conductive wires, said wires each having an electrically insulated exterior covering and a nominally curved end portion;

said nominally curved end portions each having a portion of said exterior covering removed for electrically exposing a length of bare metal conductive wire and terminating along a line defined by a radial of said hose body;

a hard plastic hollow handle body having a handle portion and a projecting hollow end portion, said handle portion having a projecting rib adjacent said end portion, and said end portion being received within said hose body and having outwardly projecting mounting means adjacent said handle portion rib;

a plurality of outwardly projecting wire termination blocks mounted longitudinally on said handle body end portion for aligning and securing said wire end portions to said handle body end portion;

a plurality of electrically conductive connector wires secured to said handle portion and extending outside said handle body end portion, said connector wires each having an electrically exposed end securely affixed to one of said electrically exposed end portions of said hose body wires for providing electrical contact between said hose body and said handle body; and a slideable hard plastic sleeve of nominally circular cross-section and a diameter greater than said hose body for securing said hose body to said handle body, said sleeve having interiorly projecting distal tabs for removably securing said sleeve to the rib and mounting means located on said handle body end portion.

28. The hose assembly of claim 27, wherein the sleeve closes the termination blocks to prevent removal of the hose body wire end portions.

* * * * *